(12) United States Patent
Satoh

(10) Patent No.: US 6,307,714 B2
(45) Date of Patent: *Oct. 23, 2001

(54) MAGNETIC HEAD

(75) Inventor: Hidezi Satoh, Niigata-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,743

(22) Filed: Feb. 8, 1999

(30) Foreign Application Priority Data

Feb. 17, 1998 (JP) .................................. 10-034510

(51) Int. Cl.[7] ..................................................... G11B 5/60
(52) U.S. Cl. ..................... 360/234.6; 360/235.1
(58) Field of Search ............................... 360/234.6, 235.1, 360/234.3

(56) References Cited

U.S. PATENT DOCUMENTS

| 5,687,042 | 11/1997 | Chhabra et al. . |
| 5,696,652 | 12/1997 | Satoh . |
| 5,761,001 | 6/1998 | Watanabe et al. . |

*Primary Examiner*—Allen Cao
(74) *Attorney, Agent, or Firm*—Brinks Hofer Gilson & Lione

(57) ABSTRACT

A magnetic head includes a slider having any one of recording and reproducing elements, and a flexure having an elastically deformative tongue. The slider and the flexure are bonded together with a resin adhesive therebetween. The resin adhesive has a Young's modulus E in a range of 700 to 5,200 $kg/cm^2$ at 25° C. and a bond strength of 50 gf or more.

8 Claims, 2 Drawing Sheets

MAGNETIC HEAD

BACKGROUND OF THE INVENTION

1. Field of the Invention

The present invention relates to a floating type magnetic head device for use in a hard disk apparatus or the like. In particular, the invention relates to a magnetic head in which a slider and a flexure for supporting the slider are bonded together with an adhesive.

2. Description of the Related Art

FIG. 3 is a partial side view of a known magnetic head device for use in a hard disk apparatus.

The magnetic head device includes a slider 1 and a support 2 for supporting the slider 1.

The slider 1 is composed of a ceramic material or the like. A thin-film element 4 is provided on the trailing end B, and the thin-film element 4 includes an MR head (read head) for reading magnetic signals by detecting a leakage magnetic field from a recording medium such as a hard disk, using a magnetoresistance effect, and an inductive head (write head) in which a coil and so on are formed by patterning.

The support 2 includes a load beam 5 and a flexure 6.

The load beam 5 is composed of a leaf spring material such as stainless steel, and has a bent section 5a having rigidity on each side of the front portion. A predetermined elastic force can be displayed at the base end of the load beam 5 in which the bent section 5a is not formed.

A spherical pivot 7 which protrudes downward in the drawing is formed in the front portion of the load beam 5, and the slider 1 abuts against the pivot 7 with the flexure 6 therebetween.

The flexure 6 is composed of a leaf spring such as stainless steel. The flexure 6 includes a fixed section 6a and a tongue 6b, and a step 6c connects the fixed section 6a to the tongue 6b.

As shown in FIG. 3, to the lower surface of the tongue 6b, the slider 1 is bonded with a resin adhesive 20. An example of the resin adhesive 20 is a thermosetting epoxy resin adhesive.

A conductive pattern (not shown in the drawing) is provided on the reverse side of the tongue 6b, and an electrode terminal section (not shown in the drawing) formed of a thin film extracted from the thin-film element 4 is provided on the trailing end B of the slider 1. At the junction between the conductive pattern and the electrode terminal section, a joint 9 is formed by ball bonding using gold (Au) or the like. The joint 9 is covered with a reinforcing resin film 10 for protection.

A fillet conductive resin film 21 is formed between the leading end A of the slider 1 and the tongue 6b. The conductive resin film 21 is provided to secure electrical connection between the slider 1 and the flexure 6 and to dissipate static electricity to the support 2.

The upper surface of the tongue 6b abuts against the pivot 7 formed on the load beam 5, and the slider 1 bonded to the lower surface of the tongue 6b can change the attitude freely, by means of elasticity of the tongue 6b, with the apex of the pivot 7 serving as a fulcrum.

The slider 1 of the magnetic head device is applied force with the elastic force of the base end of the load beam 5 in the direction of the disk D. The magnetic head device is used for a so-called "CSS" (Contact Start Stop) type hard disk apparatus or the like, and when the disk D stops, an air bearing surface (flying surface) 1a comes into contact with the recording surface of the disk D. When the disk D starts, an airflow occurs between the slider 1 and the surface of the disk D along the disk movement, and the slider 1 is lifted by a short spacing δ2 from the surface of the disk D because of a lifting force caused by the airflow.

When the slider 1 is lifted, as shown in FIG. 3, the leading end A of the slider 1 is lifted higher above the disk D than the trailing end B. While maintaining the lifting attitude, magnetic signals from the disk are detected by the MR head of the thin-film element 4, or the magnetic signals are written by the inductive head.

In the conventional magnetic head device, however, the flatness or crown height of the air bearing surface 1a of the slider 1 may easily change, resulting in extreme difficulty in setting the spacing δ2 at a given amount.

The flatness or crown height of the air bearing surface 1a of the slider 1 easily changes because a rigid adhesive such as a thermosetting epoxy resin adhesive is conventionally used as the resin adhesive 20 for bonding the upper surface of the slider 1 and the lower surface of the tongue 6b of the flexure 6 together.

As shown in FIG. 3, the trailing end B of the slider 1 is rigidly bonded to the tongue 6b of the flexure 6 by the joint 9 formed by ball bonding.

Additionally, since the slider 1 has a coefficient of thermal expansion which is different from that of the flexure 6, if the resin adhesive 20 bonding the upper surface of the slider 1 and the lower surface of the tongue 6b together is rigid, thermal stress owing to the difference in coefficient of thermal expansion between the tongue 6 and the slider 1 may affect the slider 1 with the resin adhesive 20 therebetween, resulting in adhesive deformation with respect to the slider 1.

Generally, since the flexure 6 has a larger coefficient of thermal expansion in comparison with the slider 1, for example, in the low temperature region, the air bearing surface 1a of the slider 1 is deformed to be convex in relation to the disk D, and thus a spacing loss increases, resulting in a decrease in output.

In the high temperature region, the air bearing surface 1a of the slider 1 is deformed to be concave in relation to the disk D, and thus it is highly possible that the trailing end B of the slider 1 collides with the surface of the disk D, and the minimum flying height (spacing amount) cannot be guaranteed.

Also, as shown in FIG. 3, when the conductive resin film 21 is provided between the leading end A of the slider 1 and the tongue 6b of the flexure 6, if the conductive resin film 21 is rigid the same as the resin adhesive 20, both the trailing end B and the leading end A of the slider 1 are rigidly bonded, resulting in larger adhesive deformation with respect to the slider 1 owing to thermal stress.

SUMMARY OF THE INVENTION

The present invention has been achieved in order to overcome the difficulties noted above with respect to the conventional art. It is an object of the present invention to provide a magnetic head which can reduce adhesive deformation with respect to a slider by using a resin adhesive which is flexible particularly after curing in order to bond the slider and a flexure together.

In accordance with the present invention, a magnetic head includes a slider having an element for recording and/or reproducing and a flexure having an elastically deformative tongue. The slider and the flexure are bonded together with a resin adhesive therebetween. The resin adhesive has a Young's modulus E in the range of 700 to 5,200 kg/cm² at 25° C. and a bond strength of 50 gf or more.

Preferably, the resin adhesive has a glass transition temperature in the range of 4 to 70° C.

Also, preferably, the resin adhesive has a product {E·(Tg−25° C.)} obtained by multiplying the Young's modulus E at 25° C. by the temperature obtained by subtracting 25° C. from the glass transition temperature Tg in the range of 7,000 to 234,000 kg·° C./cm².

Also, when a conductive resin film is formed between an end of the slider and the flexure as a countermeasure against static electricity, the conductive resin film used has the same properties as those of the resin adhesive described above.

Although, in conventional art, wiring is directly connected to a slider in order to output signals from a thin-film element provided on the slider or to input signals to the thin-film element, as the slider is miniaturized, use of a magnetic head, in which a conductive pattern is formed on a flexure for bonding the slider and the conductive pattern and a conductive terminal section provided on the slider are bonded together with a ball bonding technique, has been implemented.

However, since one end (trailing end) of the slider is rigidly bonded to the flexure with a gold bump by ball bonding, if a resin adhesive used for connecting the slider and the flexure is rigid, adhesive deformation may easily occur in which the flatness or crown height of the air bearing surface (flying surface) changes after bonding.

Therefore, a flexible resin adhesive which can absorb strain owing to the difference in coefficient of thermal expansion between the slider and the flexure and which can decrease internal stress resulting from curing shrinkage is required as the resin adhesive used for bonding the slider and the flexure.

For example, the resin adhesive may contain a thermoplastic resin such as an acrylic resin, a polyurethane resin, a polyester resin, or a nylon resin as a major constituent, or may contain a thermosetting resin if it has elasticity in the operating temperature region.

The factors that determine flexibility of a resin adhesive (after curing) are the Young's modulus E and the glass transition temperature Tg of the resin adhesive.

When the glass transition temperature Tg of the resin adhesive is higher than the operating temperature T and the resin adhesive is assumed to be an elastic body (having a Young's modulus E), a thermal stress $\delta$ caused by the resin adhesive to the slider (and the flexure) is represented by the following equation 1:

$$\delta = E \cdot \epsilon \int E(T) \cdot \Delta\alpha \cdot (Tg-T) dT \qquad \text{EQUATION 1}$$

(wherein Tg>T)

where $\epsilon$ is a strain between the slider and the flexure, and $\Delta\alpha$ is a difference in coefficient of thermal expansion between the slider and the flexure.

In reality, since the resin adhesive (after curing) is a viscoelastic body, a portion of the strain $\epsilon$ between the slider and the flexure is absorbed (buffered) by viscous deformation and does not contribute to adhesive deformation.

The adhesive deformation of the slider is considered to have a positive linear relationship with thermal stress $\delta$. Therefore, at an operating temperature T, as the Young's modulus E of the resin adhesive increases and as the glass transition temperature Tg increases, thermal stress $\delta$ increases and adhesive deformation increases.

When the glass transition temperature Tg of the resin adhesive is lower than the operating temperature T, the Young's modulus of the adhesive decreases, and the resin adhesive has rubber elasticity. Therefore, even if a strain $\epsilon$ occurs between the slider and the flexure, the strain $\epsilon$ is absorbed by deformation of the adhesive, and thus, thermal stress $\delta$ that causes adhesive deformation does not show great effects between the slider and the flexure.

The present inventors measured adhesive deformation of the slider using a plurality of resin adhesives having different properties for bonding the slider and the flexure together.

In experimentation, resin adhesive sample Nos. 1 through 10 shown in Table 1 were applied to joining surfaces of the slider and the flexure, and the resin adhesives were cured at 120° C. to bond the slider and the flexure together.

Also, a gold bump was formed between the trailing end of the slider and the flexure, and in order to protect the bump, the bump was covered with a resin film.

The Young's modulus E of the resin adhesive was measured at 25° C. in accordance with a tensile test method (stress/displacement curve). The glass transition temperature Tg of the resin adhesive was measured in accordance with a thermal mechanical analysis (TMA), and the adhesive deformation of the slider was measured by a WYCO flatness meter. Bond strength was measured by a peel test in which, using a slider and a flexure bonded to each other with a resin adhesive, the flexure was pulled perpendicular to the bond plane between the slider and the flexure.

TABLE 1

| Sample | | Young's modulus E (25° C.) | Glass transition temperature | Adhesive deformation (Crown height) (nm) | | | Bond strength (gf) | |
|---|---|---|---|---|---|---|---|---|
| No. | Adhesive | (kg/cm²) | Tg (° C.) | 5° C. | 25° C. | 50° C. | 25° C. | 50° C. |
| 1 | Epoxy | 5,000 | 34 | 2.0 | 0.4 | 0.1 | 87 | 80 |
| 2 | Epoxy | 13,500 | 132 | 28.0 | 27.4 | 21.0 | 51 | 88 |
| 3 | Acrylic | 400 | 28 | 1.5 | 0.4 | 0.1 | 30 | 10 |
| 4 | Acrylic | 700 | 35 | 1.1 | 0.4 | 0.1 | 75 | 60 |
| 5 | Acrylic | 1,000 | 4 | 1.7 | 0.7 | 0.1 | 70 | 55 |
| 6 | Acrylic | 3,000 | 69 | 1.8 | 1.3 | 0.5 | 71 | 70 |
| 7 | Acrylic | 3,500 | 20 | 1.7 | 0.8 | 0.2 | 80 | 62 |
| 8 | Acrylic | 5,200 | 70 | 3.0 | 2.0 | 0.7 | 81 | 79 |
| 9 | Acrylic | 7,400 | 78 | 13.5 | 9.8 | 6.5 | 58 | 70 |
| 10 | Cyanoacrylate | 14,800 | 130 | 23.1 | 22.8 | 17.4 | 75 | 98 |

A positive adhesive deformation shown in Table 1 indicates that the air bearing surface (flying surface) of the slider protrudes in the direction of a disk, and a distance between the peak of the protrusion and the air bearing surface before deformation is defined as the adhesive deformation.

As shown in Table 1, sample Nos. 2, 9, and 10 have a significantly higher adhesive deformation at 5° C., 25° C., and 50° C. in comparison with other samples.

With respect to sample Nos. 2, 9, and 10, the Young's modulus E of the resin adhesive at 25° C. and the glass transition temperature Tg are significantly higher in comparison with other samples.

Therefore, the thermal stress δ that affects the slider increases (refer to equation 1), resulting in a significantly high adhesive deformation.

In order to improve the reliability of the flying height (spacing), the variation in the flying height in response to temperature must be suppressed within ±3 nm. Therefore, the adhesive deformation of the slider at each of 5° C., 25° C., and 50° C. also must be suppressed within ±3 nm, and a difference between the adhesive deformation of the slider at an operating temperature of 5° C. and the adhesive deformation of the slider at an operating temperature of 50° C. also must be suppressed within ±3 nm.

Sample Nos. 1, 3, 4, 5, 6, 7, and 8 in table 1 satisfy the above-mentioned conditions.

Therefore, in view of the adhesive deformation of the slider, preferably, the resin adhesive has a Young's modulus at 25° C. of 700 to 5,200 kg/cm$^2$ and a glass transition temperature Tg of 4 to 70° C.

In sample No. 3, although the adhesive deformation is suppressed to 3 nm or less, the bond strength (peel strength) is 50 gf or less which is lower in comparison with other samples.

In sample No. 5, although the glass transition temperature of 4° C. is significantly low, the bond strength (peel strength) is 50 gf or more.

That is, the major factor which determines the bond strength presumably lies in the Young's modulus E rather than the glass transition temperature Tg.

In detail, at an operating temperature of 25° C., with respect to sample No. 5, although the resin adhesive is considered to have significantly low elasticity since the glass transition temperature is 4° C., the actual resin adhesive in sample No. 5 functions as a viscoelastic body and the bond strength does not greatly decrease since the resin adhesive has a significantly high Young's modulus E of 1,000 kg/cm$^2$ at 25° C.

On the contrary, with respect to sample No. 3, at an operating temperature of 25° C., although the resin adhesive is considered to function as a viscoelastic body and have relatively high bond strength since the glass transition temperature is 28° C., the actual resin adhesive in sample No. 3 has low bond strength since the resin adhesive has a significantly low Young's modulus E of 400 kg/cm$^2$ at 25° C.

Accordingly, in table 1, preferable samples are Nos. 1, 4, 5, 6, 7, and 8.

These samples have a Young's modulus E at 25° C. in the range of 700 to 5,200 kg/cm$^2$ and a bond strength of 50 gf or more, which are conditions of preferred resin adhesives in the present invention.

Also, in accordance with the present invention, the glass transition temperature Tg of the resin adhesive preferably ranges from 4 to 70° C.

Next, at an operating temperature T of 25° C., a value of E(T)×(Tg−T) represented in equation 1 was calculated with respect to sample Nos. 1, 2, 3, 4, 6, 8, 9, and 10 shown in table 1.

The results are shown in table 2. In table 2, samples are listed by sorting in an ascending order with respect to the value of E(25° C.)×(Tg−25° C.). The adhesive deformation of the slider at 25° C. is also listed.

TABLE 2

| Sample No. | Adhesive | E(25° C.) · (Tg-25° C.) (Logarithmic value in parentheses) | Adhesive deformation (Crown height) (nm) 25° C. |
| --- | --- | --- | --- |
| 3 | Acrylic | 1,200 (3,079) | 0.4 |
| 4 | Acrylic | 7,000 (3,845) | 0.4 |
| 1 | Epoxy | 45,000 (4,653) | 0.4 |
| 6 | Acrylic | 132,000 (5,121) | 1.3 |
| 8 | Acrylic | 234,000 (5,326) | 2.0 |
| 9 | Acrylic | 392,200 (5,594) | 9.8 |
| 2 | Epoxy | 1,444,500 (6,160) | 27.4 |
| 10 | Cyanoacrylate | 1,554,000 (6,191) | 22.8 |

As shown in table 2, as the value of E(25° C.)×(Tg−25° C.) increases, the adhesive deformation of the slider at 25° C. increases.

As indicated in equation 1, Δα (a difference in coefficient of thermal expansion between the slider and the flexure) is a constant, in order to decrease a thermal stress δ, it is recommended that the value of E(T)×(Tg−T) be decreased.

At an operating temperature of 25° C., as shown in table 2, sample Nos. 3, 4, 1, 6, and 8 can suppress the adhesive deformation to 3 nm or less. In sample No. 3, as shown in table 1, the bond strength at 25° C. is as low as 30 gf.

Accordingly, preferable samples in table 2 are Nos. 4, 1, 6, and 8, and these samples have a value of E(25° C.)×(Tg−25° C.) in the range of 7,000 to 234,000 kg·° C./cm$^2$.

That is, by selecting a resin adhesive that has a value of E(25° C.)×(Tg−25° C.) in the range of 7,000 to 234,000 kg·° C./cm$^2$ at an operating temperature of 25° C., the adhesive deformation of the slider can be suppressed to 3 nm or less, and also, a bond strength of 50 gf or more can be obtained.

When a conductive resin film is formed between the leading end of the slider and the flexure, since the conductive resin film must be a flexible adhesive the same as the resin adhesive, the conductive resin film must have the same properties as those of the resin adhesive described above.

BRIEF DESCRIPTION OF THE DRAWINGS

FIG. 3 is a side view which shows a conventional floating type magnetic head device for use in a hard disk apparatus or the like.

DESCRIPTION OF THE PREFERRED EMBODIMENT

Figure 1:
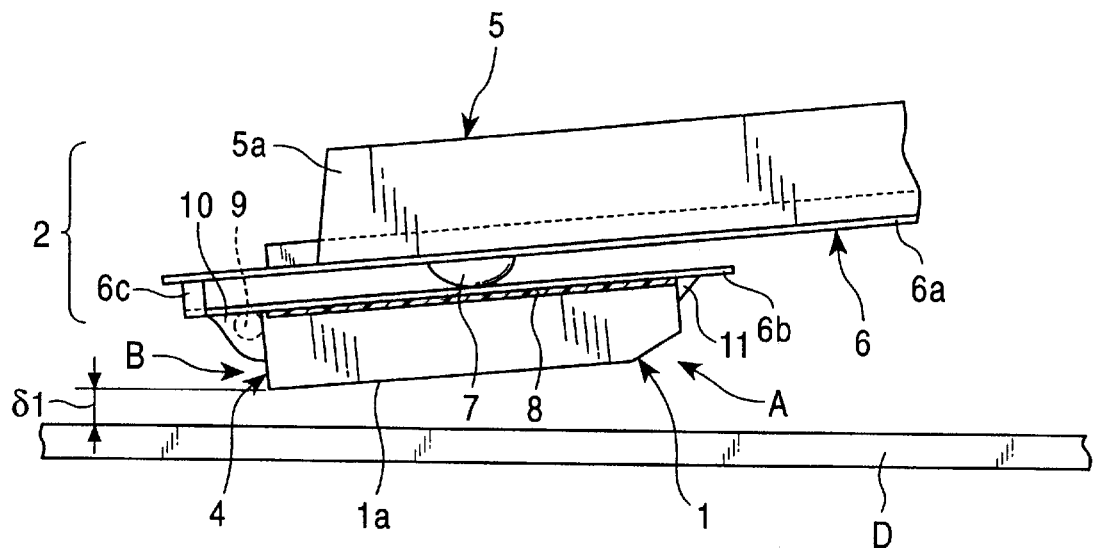
FIG. 1 is a partial side view which shows a floating type magnetic head device for use in a hard disk apparatus or the like as an embodiment of the present invention.
Figure 2:
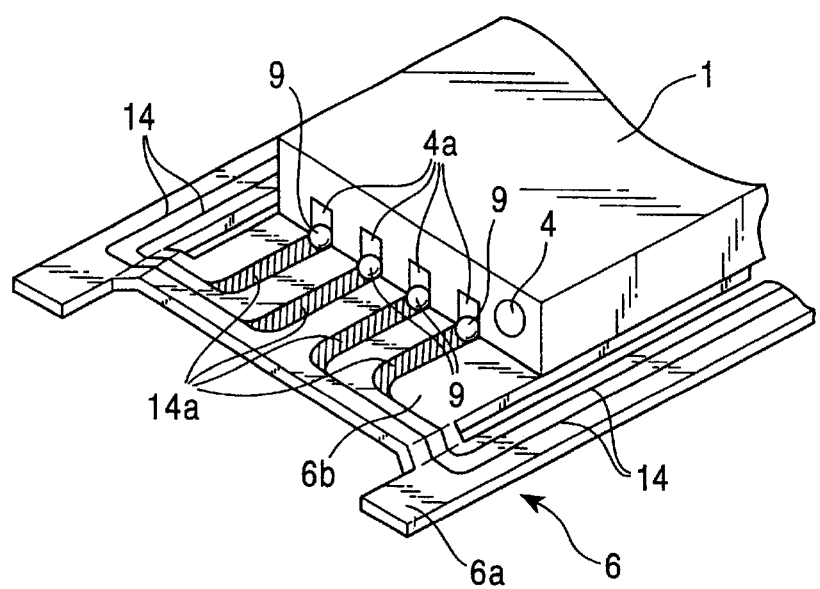
FIG. 2 is a partial perspective view of the tip region of the magnetic head device shown in FIG. 1 taken from the reverse side.
Figure 3:
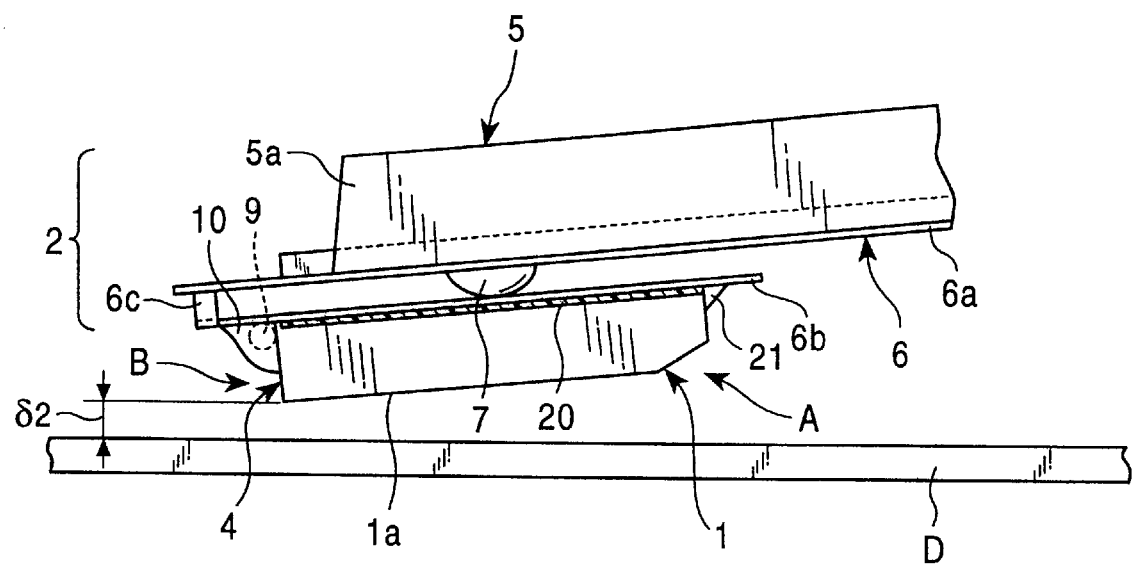

FIG. 1 is a partial side view which shows a floating type magnetic head device for use in a hard disk apparatus or the like and FIG. 2 is a partial perspective view of the tip region of the magnetic head device shown in FIG. 1 taken from the reverse side.

The magnetic head device includes a slider 1 and a support 2 for supporting the slider 1.

The slider 1 is composed of a ceramic material and a thin-film element 4 is provided on the trailing end B of the slider 1. An air bearing surface (ABS) 1a is formed on the surface of the slider 1 facing a disk D.

The thin-film element 4 is formed by depositing a magnetic material such as Permalloy (an Ni—Fe alloy) and an insulating material such as alumina. The thin-film element 4 includes a magnetic detecting section for reproducing magnetically recorded signals recorded in the disk D or a magnetic recording section for recording magnetic signals in the disk D, or both the magnetic detecting section and the magnetic recording section. The magnetic detecting section is, for example, an MR head including a magnetoresistive element (MR element). The magnetic recording section includes an inductive head in which a coil and a core are formed by patterning.

The support 2 includes a load beam 5 and a flexure 6.

The load beam 5 is composed of a leaf spring material such as stainless steel. A bent section 5a having rigidity is formed on each side of the load beam 5 from the upper right side in FIG. 1 to the vicinity of the top. The bent section 5 extends to the substantially middle position of the load beam 5, a leaf spring section (not shown in the drawing) which does not have the bent section 5a is formed from the end of the bent section 5a through the base of the load beam 5.

A spherical pivot 7 which protrudes downward in the drawing is formed on the planar section sandwiched by the bent section 5a.

The apex of the pivot 7 abuts against the upper surface of the slider 1 with a tongue 6b of the flexure 6 therebetween.

The flexure 6 is composed of a leaf spring such as stainless steel. The flexure 6 includes a fixed section 6a and the tongue 6b, and a step 6c connects the fixed section 6a to the tongue 6b.

As shown in FIG. 1, to the lower surface of the tongue 6b, the slider 1 is bonded with a resin adhesive 8.

As shown in FIG. 2, in the tip region of the flexure 6, a conductive pattern 14 is formed from the fixed section 6a through the tongue 6b. The width of the conductive pattern 14 formed on the tongue 6b increases toward the base end of the flexure 6 to form a connection 14a which connects to the slider 1.

On the trailing end B of the slider 1, an electrode terminal section 4a formed of a thin film extracted from the thin-film element 4 is provided at the same distance as that of the connection 14a.

In the present invention, the electrode terminal section 4a provided on the trailing end B of the slider 1 and the connection 14a provided on the flexure 6 are rigidly bonded together by a joint 9 formed by ball bonding using gold (Au) or the like.

The joint 9 is covered with a reinforcing resin film 10 for protection, as shown in FIG. 1.

When the trailing end B of the slider 1 is rigidly bonded to the tongue 6b of the flexure 6 by the joint 9 formed by ball bonding using Au or the like as described above, since the slider 1 has a coefficient of thermal expansion which is different from that of the flexure 6, the resin adhesive (after curing) 8 for bonding the slider 1 and the tongue 6b must be a flexible adhesive which can absorb (buffer) the strain ε caused by the difference in coefficient of thermal expansion between the slider 1 and the flexure 6 and can decrease internal stress resulting from curing shrinkage.

In the present invention, as the flexible resin adhesive 8, for example, an adhesive containing a thermoplastic resin such as an acrylic resin, a polyurethane resin, a polyester resin, or a nylon resin as a major constituent, or containing a thermosetting resin such as an epoxy resin which is flexible in the operating temperature region may be selected.

Although the method for curing the resin adhesive 8 may include a reactive process such as heating or UV radiation, or a solvent drying process, in the present invention, the method for curing is not limited to any one of the above.

Next, with respect to the properties of the resin adhesive 8 (after curing), in the present invention, the resin adhesive 8 preferably has a Young's modulus E in the range of 700 to 5,200 kg/cm$^2$ at 25° C. and a bond strength (peel strength) of 50 gf or more.

In addition, preferably, the resin adhesive 8 has a glass transition temperature Tg in the range of 4 to 70° C.

If the resin adhesive 8 has a Young's modulus E in the range of 700 to 5,200 kg/cm$^2$ at 25° C., the adhesive deformation of the slider 1 can be reduced.

Specifically, when the ABS 1a of the slider 1 protrudes in the direction of the disk D and a distance between the peak of the protrusion and the flat or crown ABS 1a before deformation is defined as an adhesive deformation, the adhesive deformation can be set at 3 nm or less in the range of 5 to 50° C., and a difference between the adhesive deformation at 5° C. and the adhesive deformation at 50° C. can be set at 3 nm or less.

Accordingly, the absolute value of the variation in the flying height δ1 (refer to FIG. 1) in response to temperature can be suppressed to 3 nm or less, and thus, problems such as collision of the trailing end B of the slider 1 with the disk D or a decrease in output because of an increase in the flying height δ1 as has been experienced in the past will not occur.

Also, preferably, at an operating temperature T of 25° C., the product obtained by multiplying the Young's modulus E at 25° C. by the difference when 25° C. is subtracted from Tg (Tg−25° C.) is in the range of 7,000 to 234,000 kg·° C./cm$^2$.

If the value E (25° C.)×(Tg−25° C.) ranges from 7,000 to 234,000 kg·° C./cm$^2$, the adhesive deformation of the slider 1 at 25° C. can be suppressed to 3 nm or less, and the bond strength (peel strength) at 25° C. can be increased to 50 gf or more.

As shown in FIG. 1, when a fillet conductive resin film 11 is formed between the leading end A of the slider 1 and the tongue 6b of the flexure 6, the conductive resin film 11 preferably has the same properties as those of the resin adhesive 8.

The reason for providing the conductive resin film 11 is to secure electrical connection between the slider 1 and the flexure 6.

The magnetic head in the present invention described above is used for a CSS type hard disk apparatus (apparatus for magnetic recording and reproducing). When the disk stops, the slider 1 is pressed toward the upper surface of the disk D by means of elastic force of the leaf spring section at the base of the load beam 5, and the ABS 1a of the slider 1 is brought into contact with the surface of the disk D. When the disk D starts to rotate, the entire slider 1 is lifted by a short distance δ1 from the surface of the disk D because of an airflow between the slider 1 and the disk D. The leading end A may be lifted higher above the disk D than the trailing end B, or the leading end A only may be lifted from the surface of the disk and the trailing end B may come into contact with the surface of the disk D continuously or discontinuously during rotation.

As described above, in the present invention, the flexible resin adhesive 8 (after curing) is used to bond the slider 1 and the tongue 6b of the flexure 6, a portion of the strain ε between the slider 1 and the tongue 6b can be absorbed (buffered) by deformation of the resin adhesive 8, and the thermal stress δ that affects the slider 1 can be reduced, enabling a decrease in the adhesive deformation of the slider 1.

Specifically, the resin adhesive 8 preferably has a Young's modulus E in the range of 700 to 5,200 kg/cm$^2$ at 25° C. and a bond strength (peel strength) of 50 gf or more. A resin adhesive 8 having the above properties can suppress the adhesive deformation of the slider 1, to 3 nm or less.

Preferably, the resin adhesive 8 has a glass transition temperature Tg in the range of 4 to 70° C.

Also, in the present invention, the resin adhesive 8 preferably has a product obtained by multiplying the Young's modulus E at 25° C. by (Tg−25° C.) in the range of 7,000 to 234,000 kg·° C./cm$^2$.

If the value of E (25° C.)×(Tg−25° C.) is in the range of 7,000 to 234,000 kg·° C./cm$^2$, the adhesive deformation of the slider 1 at 25° C. can be suppressed to 3 nm or less and the bond strength (peel strength) at 25° C. can be increased to 50 gf or more.

As described above, in the present invention, adhesive deformation of the slider 1 can be decreased, and specifically can be suppressed to 3 nm or less. Thus, spacing loss can be reduced, stable output signals are obtainable, and the minimum flying height can be secured.

As described above in detail, in the present invention, since a resin adhesive such as a thermoplastic resin which is flexible after curing is used in order to bond the slider and the flexure together, a portion of the strain between the slider and the flexure caused by the difference in coefficient of thermal expansion can be absorbed by deformation of the resin adhesive, enabling a decrease in the adhesive deformation of the slider.

With respect to properties of the resin adhesive, in the present invention, the resin adhesive preferably has a Young's modulus E in the range of 700 to 5,200 kg/cm$^2$ at 25° C. and a bond strength (peel strength) of 50 gf or more.

Also, preferably, the resin adhesive has a glass transition temperature Tg in the range of 4 to 70° C.

By using a resin adhesive having the properties described above, the adhesive deformation can be suppressed to 3 nm or less, and thus, a stable output can be obtained and the minimum flying height can be secured.

What is claimed is:

1. A magnetic head comprising:
    a slider having any one of recording and reproducing elements; and
    a flexure having an elastically deformative tongue,
    said slider and said flexure being bonded together with a flexible resin adhesive therebetween, the flexible resin to reduce adhesive deformation,
    wherein said flexible resin adhesive has a Young's modulus E in a range of 700 to 5,200 kg/cm$^2$ at 25° C. and a bond strength equal to or greater than 50 gf,
    wherein, at an operating temperature T of 25° C., said flexible resin has a product {E·(Tg−25° C.)} obtained by multiplying the Young's modulus E at 25° C. by the difference when 25° C. is subtracted from the glass transition temperature Tg of said flexible resin adhesive in a range of 7,000 to 234,000 kg·° C./cm$^2$.

2. A magnetic head according to claim 1, wherein said flexible resin adhesive has a glass transition temperature Tg in a range of 4 to 70° C.

3. A magnetic heading according to claim 1, wherein a conductive resin film is formed between an end of said slider and said flexure as a countermeasure against static electricity, and said conductive resin film has the same properties as those of said flexible resin adhesive.

4. A magnetic heading according to claim 2, wherein a conductive resin film is formed between an end of said slider and said flexure as a countermeasure against static electricity, and said conductive resin film has the same properties as those of said flexible resin adhesive.

5. A magnetic head comprising:
    a slider having any one of recording and reproducing elements; and
    a flexure having an elastically deformative tongue,
    said slider and said flexure being bonded together with a thermoplastic adhesive, the thermoplastic resin to reduce adhesive deformation,
    wherein, said thermoplastic adhesive has a Young's modulus E in a range of 700 to 5,200 kg/cm$^2$ at 25° C. and a bond strength equal to or greater than 50 gf,
    wherein, at an operating temperature T of 25° C., said thermoplastic adhesive has a product {E·(Tg−25° C.)} obtained by multiplying the Young's modulus E at 25° C. by the difference when 25° C. is subtracted from the glass transition temperature Tg of said thermoplastic adhesive in a range of 7,000 to 234,000 kg·° C./cm$^2$.

6. A magnetic head according to claim 5, wherein said thermoplastic adhesive has a glass transition temperature Tg in a range of 4 to 70° C.

7. A magnetic heading according to claim 5, wherein a conductive resin film is formed between an end of said slider and said flexure as a countermeasure against static electricity, and said conductive resin film has the same properties as those of said thermoplastic adhesive.

8. A magnetic heading according to claim 6, wherein a conductive resin film is formed between an end of said slider and said flexure as a countermeasure against static electricity, and said conductive resin film has the same properties as those of said thermoplastic adhesive.

* * * * *